United States Patent [19]

Lippmann et al.

[11] Patent Number: 5,345,398

[45] Date of Patent: Sep. 6, 1994

[54] GAUGE GLIDER

[75] Inventors: Raymond Lippmann, Ann Arbor; James E. Nelson, Waterford; Michael J. Schnars, Clarkston; James R. Chintyan, Davison; Mark C. Hansen, Ann Arbor, all of Mich.

[73] Assignee: Delco Electronics Corporation, Kokomo, Ind.

[21] Appl. No.: 943,964

[22] Filed: Sep. 11, 1992

[51] Int. Cl.$^5$ ............................................. G01F 23/36
[52] U.S. Cl. .................... 364/509; 364/571.01; 73/290 R; 340/618
[58] Field of Search ............ 73/290 R, 430; 340/618, 340/450, 450.2, 612; 328/129.1, 130.1; 377/20; 364/509, 571.01, 571.02, 571.04

[56] References Cited

U.S. PATENT DOCUMENTS

| | | | |
|---|---|---|---|
| 3,115,615 | 12/1963 | Saper | 340/37 |
| 3,983,549 | 9/1976 | Akita et al. | 340/206 |
| 3,990,073 | 11/1976 | Duttweiler | 340/347 |
| 4,102,191 | 7/1978 | Harris | 73/313 |
| 4,243,974 | 1/1981 | Mack | 340/347 |
| 4,250,750 | 2/1981 | Martinec et al. | 73/308 |
| 4,309,692 | 1/1982 | Crosby | 340/347 |
| 4,386,406 | 5/1983 | Igarashi et al. | 364/442 |
| 4,470,296 | 9/1984 | Kobyashi et al. | 73/113 |
| 4,481,597 | 11/1984 | Robbins | 364/604 |
| 4,509,044 | 4/1985 | Yachida | 364/509 |
| 4,513,277 | 4/1985 | Moore et al. | 340/59 |
| 4,546,343 | 10/1985 | Higgins et al. | 340/347 |
| 4,614,114 | 9/1986 | Matsumoto et al. | 73/313 |
| 4,635,043 | 1/1987 | Kronenberg et al. | 340/618 |
| 4,760,736 | 8/1988 | Huynh | 73/430 |
| 4,768,377 | 9/1988 | Habelmann et al. | 73/313 |
| 4,810,953 | 3/1989 | Huynh | 324/120 |
| 4,890,491 | 1/1990 | Vetter et al. | 73/290 |
| 4,897,822 | 1/1990 | Korten et al. | 367/124 |
| 4,912,646 | 3/1990 | Cerruti | 364/509 |
| 4,916,535 | 4/1990 | Volodchenko et al. | 358/101 |
| 4,982,350 | 1/1991 | Perna et al. | 364/569 |
| 4,991,435 | 2/1991 | Colarossi | 73/313 |
| 5,257,300 | 10/1993 | Bennett et al. | 73/430 |

OTHER PUBLICATIONS

Electronic Circuits—Digital and Analog, Charles A. Holt, pp. 794–795, 1978.

*Primary Examiner*—Jack B. Harvey
*Assistant Examiner*—Craig Steven Miller
*Attorney, Agent, or Firm*—Anthony L. Simon; Jimmy L. Funke

[57] ABSTRACT

A circuit apparatus for providing increased apparent resolution in digital signal processing systems includes a comparison circuit receiving an N bit digital input signal and the N most significant bits of an N+M bit output signal. The comparison circuit compares the two signals and provides a control output in response to the comparison. An N+M bit counter increases or decreases a count value which is the output signal in response to the comparison, whereby the output signal has an apparent resolution $2^M$ better than the resolution of the input signal.

18 Claims, 9 Drawing Sheets

GAUGE GLIDER

The subject of this specification is related to copending applications, Ser. No. 07/944,158 filed Sep. 11, 1992, entitled "Slew Rate Limiter with Asymmetrical Operation," Ser. No. 07/944,154 filed Sep. 11, 1992, entitled "Fuel Wobbler," Ser. No. 07/944,140 filed Sep. 11, 1992 now U.S. Pat. No. 5,325,314 entitled "Electronic Gauge Transform," and Ser. No. 07/944,145 filed Sep. 11, 1992, entitled "Maintaining Ratiometric Data in Electronically Manipulated Signal Processing Systems," all filed concurrently with this specification, assigned to the assignee of this invention, and the disclosures of which are incorporated herein by reference.

This invention relates to digital data processing circuitry and more particularly to circuitry for the manipulation of digital data to affect an apparent increase in digital signal resolution.

BACKGROUND OF THE INVENTION

In circuits in which digital signal processing is performed, data is typically handled in the form of binary words, which are transferred on data busses. In certain types of circuits, the digital signal may be a digital representation of an ideally continuous quantity, such as an analog signal. When digital signal processing is employed, the continuous nature of the signal may be lost, in that digital words may only be increased or decreased in step increments. In general, the size of the smallest step increment is inversely proportional to the available signal resolution.

One way to increase resolution in digital signal processing systems is to increase the number of bits in the digital signals processed. For example, a six bit system has the capability for more resolution than a four bit system, but does not have the capability for as much resolution as an eight bit system. One drawback of increasing the number of bits in a digital signal to increase the resolution capability is that circuitry for the manipulation of higher bit signals is more complex and costly than similar circuitry for the manipulation of lower bit signals.

In certain systems, absolute high resolution is not necessary to increase system performance. Instead, a means which would alleviate large step changes is suitable to provide the system with apparent high resolution, without incurring the cost of high resolution digital circuitry.

SUMMARY OF THE PRESENT INVENTION

This invention provides a circuit apparatus that overcomes the drawbacks of large step changes in digital signal processing circuits without requiring large amounts of high bit digital circuitry. The apparatus of this invention is suitable for implementation into circuits in which it is desired to remove the "large" step effect with changes in an output signal to provide an apparent increase in signal resolution without requiring an actual increase in resolution.

An advantageous structure to achieve these ends is provided by this invention with an apparatus for interfacing digital circuitry with N bits of resolution to additional circuitry in a manner to provide N+M bits of resolution to the additional circuitry (where M is an integer equal to or greater than zero). The structure effective to accomplish the increased resolution includes means for comparing an N bit input signal with the N most significant bits of an N+M bit output signal and for providing a control output therefrom in response to the comparison. An N+M bit counter means increments or decrements a N+M bit count output in response to the control output of the comparing means and provides the N+M bit count output on an output bus as the N+M bit output signal. The N+M bit output signal has an apparent resolution improvement over the N bit input signal of $2^M$. For example, a single increment step change in the N bit input signal results in $2^M$ step changes in the output signal, where each step change may be regarded as $\frac{1}{2}^M$ times the size of the step change in the N bit input signal.

Further improvements and modifications to this invention along with preferred applications are set forth more elaborately below.

DETAILED DESCRIPTION OF THE INVENTION

Figure 1:
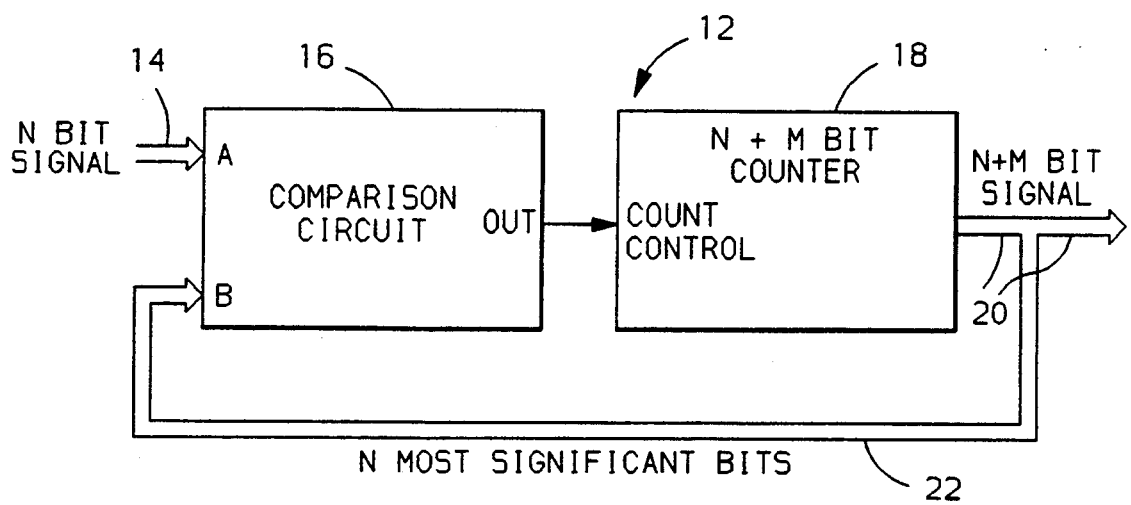
FIG. 1 is a schematic diagram of the apparatus of the invention.

Referring to FIG. 1, a digital signal, in the form of a binary word of N bits is provided on bus 14, which is connected to the A input of comparison circuit 16. At the B input of comparison circuit 16, a second digital signal, in the form of a binary word of N bits is provided on bus 22. The signal on bus 22 comprises the N most significant bits of the digital signal on bus 20, which carries the output signal from counter 18.

Comparison circuit 16 is a means for comparing the signal on bus 14 with the signal on bus 22. In response to the comparison, comparison circuit 16 provides a control output, which is coupled to the control input of counter 18, an N+M bit counter means. Counter 18, which provides an N+M bit count output that may be incremented or decremented, increments and decrements the count output in response to the control output of comparison circuit 16. If the signal on bus 14 is less than the signal on bus 22, counter 18 decrements the count output. If the signal on bus 14 is greater than the signal on bus 22, counter 18 increments the count output. The N+M bit count output of counter 18 is provided on bus 20 as the N+M bit output signal.

In a binary counting system, the bit representing numerical value of the highest power of two capable of being represented by the system is the most significant bit. For example, for a binary word 10101, assigned as a conventional binary representation of a number, 21, the first "1" from the left is the most significant bit, the first "0" from the left is the second most significant bit, etc..

Assuming that bus 20 is a conventional N+M bit parallel line bus having N+M lines, bus 22 is an N line bus, with its N lines coupled to the lines of bus 20 carrying the N most significant bits of the output signal in bus 20. The result is that the signal carried by bus 22 comprises the N most significant bits of the N+M bit output signal in bus 20.

In an example operation of the circuit shown, assume that comparison circuit 16 compares six bit signals and counter 18 is an eight bit counter (N=6, M=2). Assume also that the signal on bus 14 is higher than the signal on bus 22. In response to the output of comparison circuit 16, counter 18 increments its output four times for every increment achieved on bus 22, until the signal on bus 22 equals the signal on bus 14. In this manner, the signal on bus 20 achieves an apparent resolution four ($2^M$) times greater than that of the signal on bus 14. More specifically, every step change (increment or decrement) in the signal on bus 14 results in a change in the signal on bus 20 being broken down into $2^M$ smaller step changes, making the signal in bus 20 appear more continuous.

Figure 2:
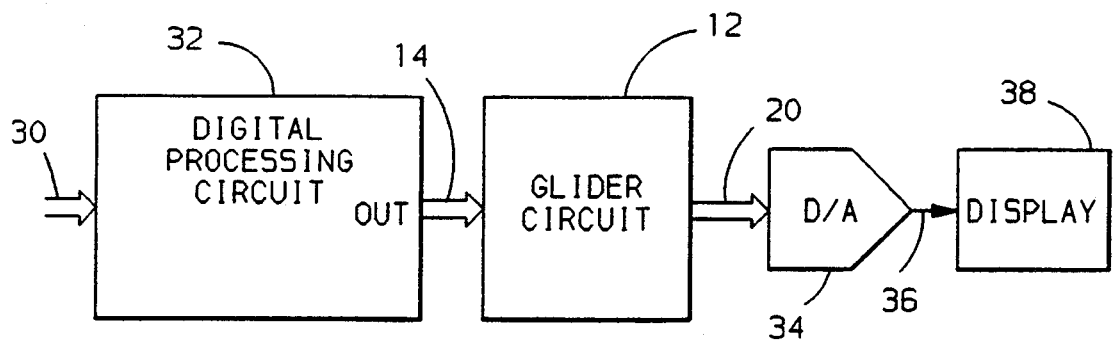
FIG. 2 is a schematic diagram of an implementation of this invention.

Advantageously, the above described functions of this invention are adequately suited for implementation into apparatus where a digital portion of the apparatus may be coupled to an analog portion of the apparatus. Referring to FIG. 2, for example, a source (not shown) may provide a signal on bus 30, which is coupled to an input of digital processing circuitry 32. Digital processing circuitry 32 may provide desired manipulations to the signal provided from bus 30, including such functions as filtering, scaling, etc..

The digital processing circuitry 32 provides its output signal on bus 14, which is input to the glider circuit 12, which is the same as the circuit in FIG. 1. The output of the glider circuit 12 provided on bus 20 is coupled to a digital to analog converter 34, which converts the signal on bus 20 to an analog signal on line 36. The analog signal on line 36 is used to drive a display 38, comprising the analog portion of the apparatus shown.

To illustrate the advantages of this invention, assume that the signal on line 14 is an eight bit signal and that the display 38 is a conventional air core gauge of the type typically used in vehicle instrumentation clusters, e.g. as an analog fuel gauge. If the glider circuit 12 were not used in the system shown, the display 38 would have at the most 256 possible positions, i.e., between empty and full in the fuel gauge. While 256 possible positions may provide an operator with enough resolution on the amount of fuel in the vehicle fuel tank, step changes in the signal on bus 14, i.e., an increment or decrement, may still be noticed by the operator as a step change in the gauge pointer position. However, with the glider circuit 12 providing a ten bit signal on bus 20, each change in pointer position is resolved into four smaller step changes. The result is that during rotation of the pointer, there are now 1024 possible positions between empty and full on the gauge. The advantage provided is that rotation of the pointer among the 1024 possible positions appears to the operator to be virtually continuous.

Figure 3:
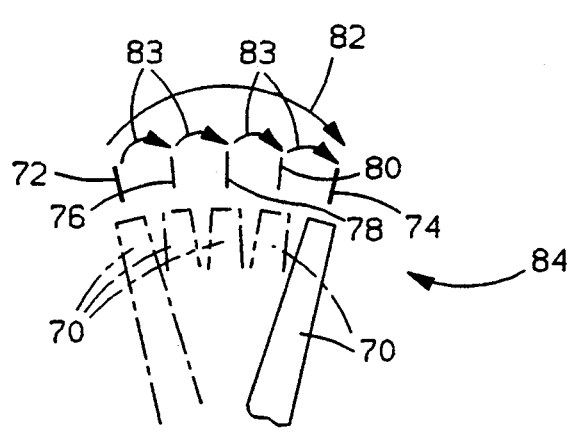
FIG. 3 is an illustration of an advantage of this invention.

FIG. 3 represents a graphic illustration of a blown-up portion of an air core gauge (or equivalent) display and shows the above mentioned advantages of this invention. Assume the pointer 70 first indicates a position 72 on the display 84. The signal on bus 14 (FIG. 2) directs the pointer to move to point 74. Without the advantages of this invention, the pointer moves in a step-type motion straight to position 74 as indicated by arrow 82. In this step-type motion, the pointer appears to jump between position 72 and 74. However, with the advantages of this invention, the pointer 70 moves from points 72 to 74 by cycling through points 76, 78 and 80, as indicated by arrows 83. When this occurs, the pointer appears to virtually sweep between points 72 and 74 in an aesthetically pleasing manner, instead of jumping from points 72 to 74.

The display example described with reference to FIGS. 2 and 3 is just an example implementation of this invention. In addition to the display 38, this invention may be used with any other type of circuitry in which an apparent increase in resolution, or a smoother transition, is desired between step changes in the input signal, i.e., bus 14.

Figure 4A:
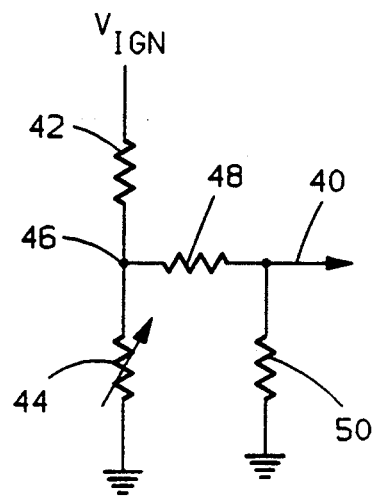
FIGS. 4 (comprising FIGS. 4a, 4b, and 4c) and 5 comprise a detailed schematic diagram of a preferred implementation of this invention.
Figure 4B:
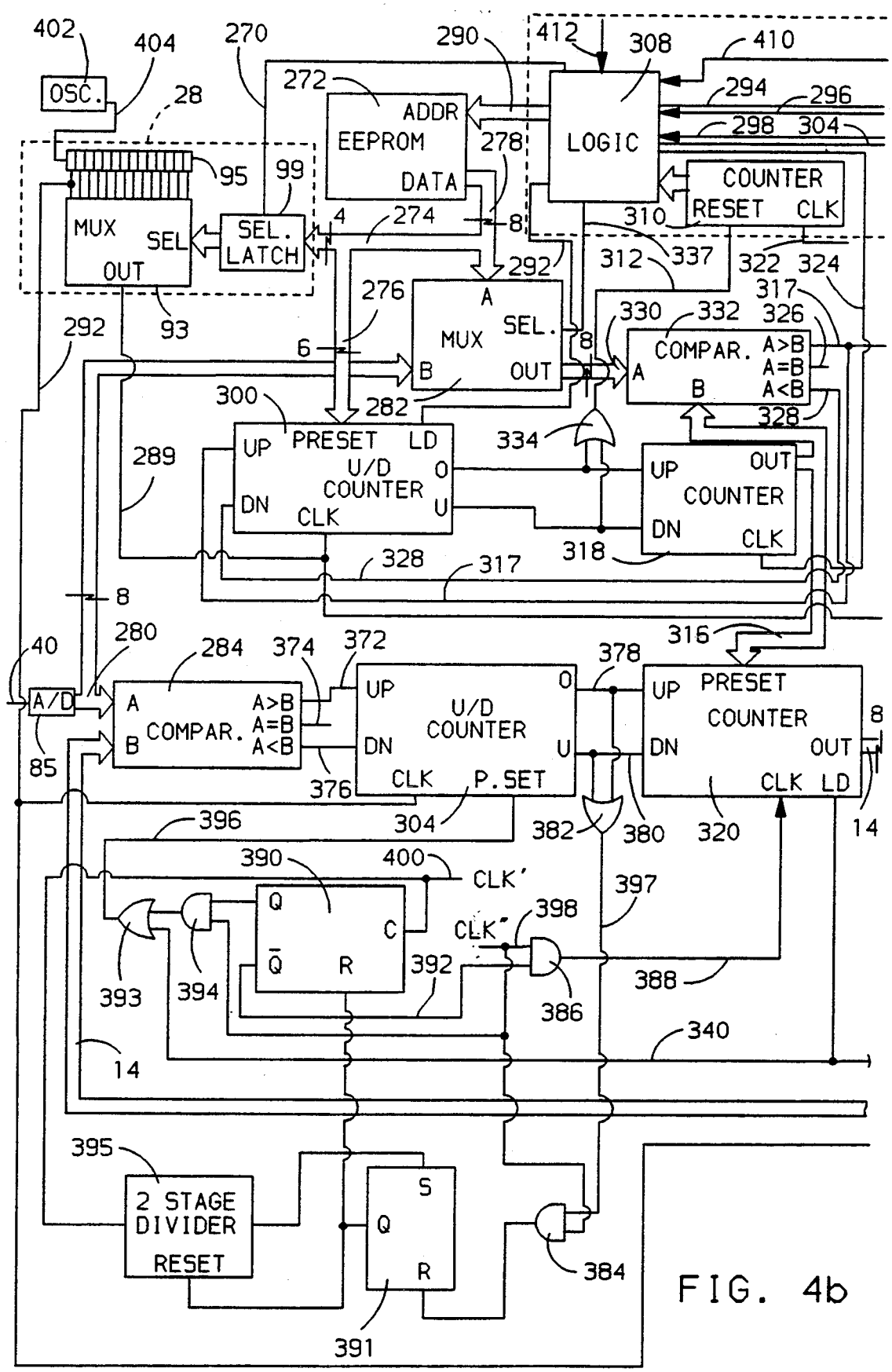
Figure 4C:
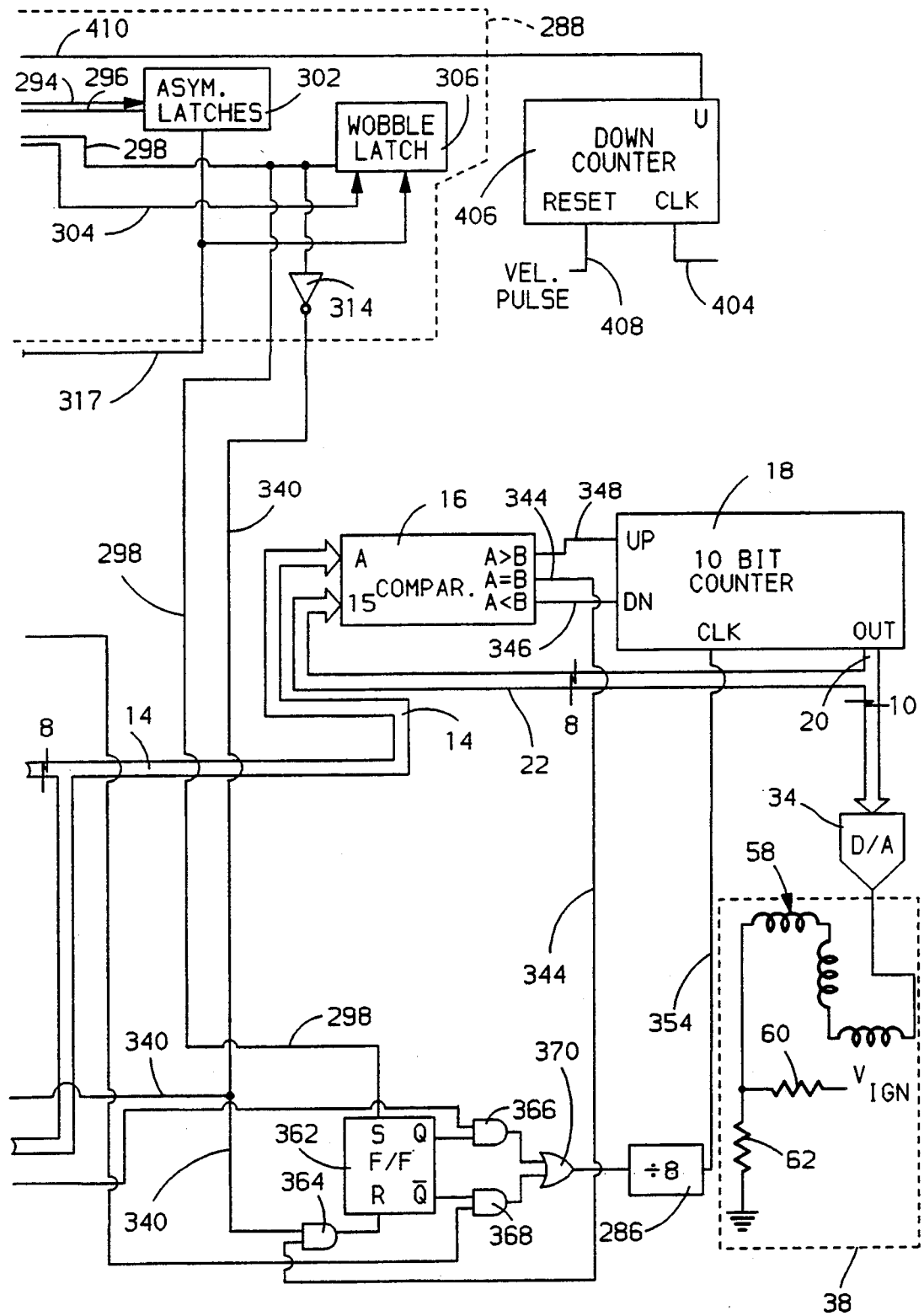
Figure 5:
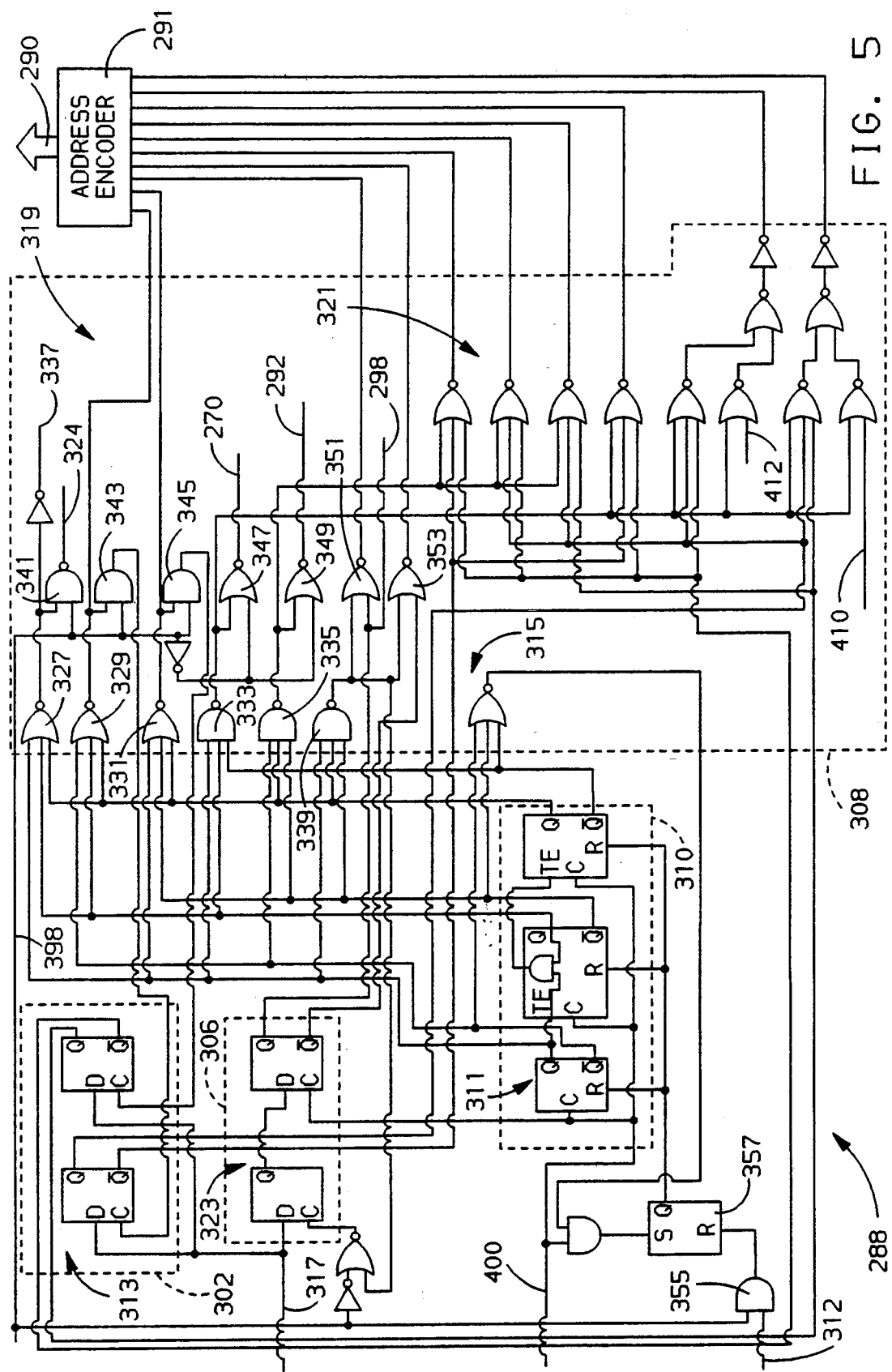

Referring to FIGS. 4 and 5, the preferred implementation of this invention is shown in combination with apparatus disclosed in the above mentioned related copending patent applications. In the preferred implementation, fuel level in a vehicle fuel tank is sensed by a fuel sender, the sender output signal is filtered and the glider circuit of this invention is used with the filter output to drive a display to indicate the level of fuel in the tank. The filtering circuit shown in FIG. 4 includes circuitry for long and short period filtering of the sender output signal, and is switched between the long and short period filters in accordance with the teachings of copending Patent Application, Attorney Docket No. G-6698, entitled "Fuel Wobbler," mentioned above.

The long period filter includes circuitry for asymmetrical filtration of the sender output signal in accordance with the teachings of copending application, Ser. No. 07/944,158 filed Sep. 11, 1992, entitled "Slew Rate Limiter with Asymmetrical Operation," mentioned above. The asymmetrical filter filters the sender signal asymmetrically, with the amount of asymmetry divided into three regions, determined by the preset input to up/down counter 300 on bus 276 in response to the output signal on bus 316. A more detailed description of the asymmetrical operation of the circuit is set forth in copending application, Attorney Docket No. G-6698, incorporated herein by reference.

More particularly, a means for sensing the level of fuel in the tank comprises variable resistance fuel sender 44 whose resistance changes with the level of fuel at the sender 44. For example, sender 44 may comprise a variable resistor with a float arm controlling the output resistance of the variable resistor. In the event of wave motion or sloshing of fuel in the fuel tank, the float arm moves up and down with the surface of the fuel in the tank, causing the impedance of sender to vary.

Sender 44 is connected in series with load resistor 42 between the vehicle ignition voltage supply line and ground. The signal on line 46 is a voltage signal that varies with the impedance of sender 44, corresponding to the sensed level of the fuel in the tank. Resistors 48 and 50 comprise a voltage divider that provides a signal on line 40 in proportion to the signal on line 46 at a voltage level suitable for processing by the remainder of the circuitry, which is preferably incorporated into an integrated circuit.

The signal on line 40 is input to A/D converter 85, which outputs a corresponding digital signal on bus 280. Bus 280 provides the digital data signal to the A input of comparator 284 for short period filtering and to multiplexer 282, which is normally selected through line 337 so that the data signal on bus 280 is coupled to bus 330, which is in turn connected to the A input of comparator 332 for long period asymmetrical filtering. The B input of comparator 284 is coupled to bus 14, the output bus of counter 320 in the short period filter. The B input of comparator 332 is coupled to bus 316, the output bus of counter 318 in the long period filter.

Both comparators 284 and 332 have three output lines, an A>B line (372 and 317), and A=B line (374 and 326) and an A<B line (376 and 328), on which output signals respectively occur when the A and B input signals follow the corresponding logic functions. For comparator 332, the A>B line 317 and A<B line 328 are connected to the up and down inputs of up/down counter 300. Likewise, for comparator 284, the A>B line 372 and the A<B line 376 are connected to the up and down inputs of up/down counter 304.

The state machine 288 comprising logic 308, asymmetry latches 302, wobble latch 306 and counter 310 and controls the operation of the long period filter and the wobble mode, i.e., whether or not the short period filter is activated. The up/down counter 300 receives a slow clock signal through line 289 and up/down counter 300 counts up and/or down in response to the signals on output lines 317 and 328 of comparator 332 until an overflow or underflow condition occurs. When an overflow or underflow condition occurs, a signal is provided via OR gate 334 and line 312 to counter 310 of state machine 288, which starts a cycle of the state machine.

When the state machine 288 cycles, it cycles through a series of states, controlled by counter 310. In the first state, State 0, a pulse signal is provided on line 324 to counter 318, clocking counter 318 one count up or one count down in accordance with whether up/down counter 300 is overflowing or underflowing.

State machine 288 then cycles to State 1, during which state logic circuitry 308 provides a word on bus 290, addressing memory 272 to provide a word on bus 278 representing a break point, "a", between the first and second asymmetry regions of the circuit. Also in State 1, a signal is provided on line 337 selecting the A input to multiplexer 282, which is connected to bus 278, the data output bus for memory 272. The signal on line 337 maintains this value until the state machine returns to State 0. A comparison is made by comparator 332 between break point a and the output of counter 318 on bus 316. A signal on line 317 that is logic 1 if the signal on bus 316 is less than point a and logic 0 if the signal on bus 316 is greater than point a is latched into asymmetry latches 302.

During the next state, State 2, logic circuitry 308 provides a word on bus 290, addressing memory 272, which provides a word on bus 278 representing a break point, "b," between the second and third asymmetry regions. Comparator 332 compares point b and the output of counter 318 on bus 316. The comparison result on line 317 is latched into asymmetry latches 302.

During State 3, an address word on bus 290 addresses a time constant from memory 272. The time constant is determined in response to whether there is an initialization signal on line 412, e.g., from an initialization timer, and in response to a signal on line 410 from down counter 406. Down counter 406 is reset to a starting count with every pulse through line 408 from a standard vehicle velocity sensor (not shown). If counter 406 does not receive a velocity pulse on line 408, then counter 406 counts down to an underflow condition, and outputs an underflow signal on line 410, indicating that the vehicle is not moving. If the vehicle is not moving, a short time constant is desired because, with no vehicle motion, there is nothing to cause wave motion of the fuel, and therefore there is no need for heavy damping of the fuel sender signal.

The time constant also varies in response to the asymmetry range of the output signal on bus 316, as determined by asymmetry latches 302. The time constant is provided on bus 274, comprising four lines of bus 278, to the input of latch 99 in divider 28, and is latched into latch 99 with a signal on line 270 from logic circuitry 308. The output of latch 99 controls multiplexer 93, which couples one of the outputs of the series of fourteen frequency dividers 95 to line 289. A clock signal is input to the frequency dividers 95 from oscillator 402 through line 404.

The clock signal on line 289 is generally as follows. During initialization and when the vehicle is not moving (as determined by counter 406), the signal on line 289 is as fast as the fast clock signal on line 292. Otherwise, the signal on line 289 is relatively slow compared to the signal on line 292. Three possible slow clock frequencies are provided, one for every region of asymmetry as determined by asymmetry latches 302, with lower clock frequencies corresponding to higher levels of fuel in the tank.

During State 4, a word is provided on bus 290, responsive to asymmetry latches 302, addressing memory 272 to provide the proper asymmetry preset on bus 276, comprising six of the lines of bus 278. A load signal is provided on line 292, triggering counter 300 to load the asymmetry preset on bus 276 to the preset input of up/down counter 300.

During State 5, a word responsive to wobble latch 306 is provided on bus 290 to address from memory 272 the wobble trip point (the point below which short period filtering is desired and above which long period filtering is desired), which is provided on bus 278 and coupled to the A input of comparator 332. A>B output line 317 of comparator 332 is coupled to the wobble latch 306, which latches in a determination of whether the output of counter 318 on bus 316 is above or below the wobble point. If, before the comparison, the wobble latch 306 indicated that the short period filter was inactive (indicating that the fuel level was above the wobble trip point), then the wobble trip point addressed equals the value, trip point (a preset value corresponding to a mostly empty fuel tank). If, before the comparison, the wobble latch 306 indicated that the short period filter was active, then the wobble trip point addressed equals the value, trip point plus delta, where delta is relatively small compared to trip point.

During the next state, the counter 310 is reset, resetting the state machine 288, and bringing line 337 high again so that the signal on bus 280 is again coupled to comparator 332.

In the state machine 288, wobble latch 306 controls through lines 298 and 340 whether the short period filter is enabled. When the short period filter is not enabled, line 340 provides a command to the load input of counter 320. In response to the load command, counter 320 forces its output, connected to bus 14, to a value equal to its preset input, which is coupled to bus 316, the output of the long period filter. In this manner, output bus 14 carries the output signal of the long period filter when the short period filter is not activated.

When wobble latch 306 determines that the short period filter is activated, counter 320 is responsive to up/down counter 304 and not bus 316. The short period filter operates as follows. Comparator 284 compares the signal on bus 280 to the filter output on bus 14. In response to the comparison results on lines 372 and 376, up/down counter 304 counts either up or down with the fast clock signal on line 292.

When counter 304 underflows or overflows, the circuitry including AND gates 384, 386 and 394, OR gate 393 and flip flops 390 and 391 comprise a second state machine for controlling the short period filter. The second state machine has only two states. In State 0, counter 320 is clocked once up or once down in accordance with the signals on line 378 and 380. In state 1, counter 304 is loaded with a hard wired preset value of 32, so that the short period filter filters symmetrically. The short period filter may be made asymmetrical if a designer so desires, but such is not the preferred embodiment. The second state machine is reset by a signal output from two stage divider 395 to the set input of flip flop 391 and the circuitry then waits for another overflow or underflow signal from up/down counter 304. While both lines 378 and 380 are low, clock signals on line 388 do not affect counter 320.

Referring to FIG. 5, an example implementation of state machine 288 is shown. The circuit shown is an example implementation and any circuitry that performs the equivalent control functions my be used. In the state machine, counter 310 comprises three flip flops 311 that cycle the state machine 288 through the states at a rate determined by a first clock signal on line 400. The output of counter 310 controls the data output of logic circuit 308, comprising decoding gates 315, command gates 319 and word gates 321.

The asymmetry latches 302 comprise two latches 313, each storing one of the results of the two comparisons made during State 1 and State 2 of state machine 288. Wobble latch 306 comprises two latches 323.

In short, state machine 288 controls the outputs of gates 327-335 and gate 339. During State 0, gate 327 provides the output signal on line 337 that controls multiplexer 282. With a clock signal from line 398, gate 341 provides the command on line 324 to clock counter 318. During State 1, gates 329 and 343 provide the clock command for the first latch 313 to latch in the first asymmetry region comparison result. During State 2, gates 331 and 345 provide the clock command for the second latch 313 to latch in the second asymmetry region comparison result. During State 3, gates 333 and 347 provide the command on line 270 commanding divider 28 to latch into latch 99 the time constant. During State 4, gates 335 and 349 provide the signal on line 292 commanding up/down counter 300 to load the preset value. During State 5, gates 339, 351 and 353 provide the signal controlling the wobble latch 306, which outputs the signal on line 298 controlling whether the short period filter is activated. In the last state, the counter 310 is reset to State 0 and held there waiting for a reset command from line 312 through gate 355 and flip flop 357. The remaining gates 321 provide part of the word output on bus 290 via address encoder 291, which is easily implemented by one skilled in the art.

Referring again to FIG. 4, the output bus 14, connected to the output of counter 320, carries the filter output signal. For reasons set forth in copending application Ser. No. 07/944,140 filed Sep. 11, 1992, now U.S. Pat. No. 5,325,314 entitled "Electronic Gauge Transform," mentioned above, a curve fitter may be implemented between bus 14 and comparator 16. If such a curve fitter is desired, it may be implemented in accordance with the teachings of copending application Ser. No. 07/944,140 filed Sep. 11, 1992, now U.S. Pat. No. 5,325,314 incorporated by reference. In the example shown, a curve fitter is not implemented.

Bus 14 is coupled to the glider circuit comprising comparator 16, flip/flop 362 and ten bit counter 18, which function to increase the apparent resolution of the output signal.

When wobble latch 306 indicates selection of the short period filter, a logic high signal is output on line 298. The signal on line 298 sets flip/flop 362, which outputs a logic high signal to one input of AND gate 366. When flip/flop 362 is set, the fast clock signal on line 292 is coupled, via AND gate 366 and OR gate 370 to a three stage divider 286, which divides the clock signal by eight and clocks counter 18 with the resultant signal. Counter 18 counts at one eighth the clock rate of the signal on line 292, either up or down in accordance with the signals on lines 348 and 346. A count down signal on line 346 occurs when the signal on bus 14 is less than the eight most significant bits of the output of counter 18 on bus 22 and a count up signal on line 348 occurs when the signal on bus 14 is greater than the eight most significant bits of the signal on bus 22.

When wobble latch 306 selects the long period filter, line 340 goes high, providing a logic high signal to one input of AND gate 364. A clock frequency of one eighth of the fast clock signal on line 292, however, remains coupled to the clock input of counter 18 until a signal on line 344 indicates that the output of counter 18 equals (to eight significant bits) the signal on line 14, which corresponds to the value on bus 316 since counter 320 is loading the output bus 14 from bus 316 at the preset input. When the signal occurs on line 344, AND gate 364 outputs a logic high signal that resets flip/flop 362. When flip/flop 362 is reset, the slow clock signal on line 289 is coupled via AND gate 368 and OR gate 370 to three stage divider 286, and a signal with one eighth the frequency of the clock signal on line 289 results on line 354, the clock input of counter 18. In this manner, if the vehicle fuel tank is being filled with fuel, the counter 18 will not switch to the slow clock signal until the output on bus 20 (and the display) matches the actual fuel level, as indicated on bus 14.

The output of counter 18 is a ten bit digital signal. However, only the eight most significant bits are connected to the B input of comparator 16. The ten bit signal on bus 20 provides an apparent resolution four times greater than that of the signal on bus 14, providing more continuous appearing transitions of an analog gauge display. The net result is that when the signal on bus 14 increases or decreases by one, counter 18 counts up or down respectively by four, thereby achieving increased apparent resolution.

The rate or frequency of change of the glider circuit must be carefully matched to the rate of change of the filter output signals. For example, referring to FIG. 3, if the glider rate of change is too fast, the four steps 76, 78, 80 and 74 will occur too fast. When this occurs, as the output of the filter changes, pointer 70 will appear to jump between point 72 and 74, hitting points 76, 78 and 80 too rapidly, appearing to stick at point 74, and then jumping to the next point.

If the glider frequency is too slow, the result is not as jumpy, but the glider output will lag the filter output. What is desired is that a glider with an input of N bits have the N most significant bits of the N+M bit output signal with the same nominal rate of change as the N input bits. The resulting rate of change of the N+M bit output signal is the rate of change of the N bit input signal times $2^M$. Slower rates or frequencies are also acceptable if glider lag is desirable.

Three stage divider 286 acts to time the glider circuit with the filter circuits. The up/down counters are 6 bit counters having a count range from 0 to 63. The (maximum) nominal rate or frequency of changes on the filter output is $1/(2^{(L-1)})=1/32$ (where L=6) times the clock rate of the up/down counters (300 or 304), since 32 is the symmetrical reset value. This is only the nominal rate or frequency because the asymmetrical operation of the long period filter due to the varying preset inputs to up/down counter 300 may affect the actual rate of change. For the glider rate of change to correctly complement the rate of change of the filters, the frequency of the clock signal on line 354 is $2^M/(2^{(L-1)})$ times the frequency of the signal for the up/down counter (300 or 304), where L is the number of bits of the up/down counter (300 or 304). In other words, the clock signal on line 354 has a frequency substantially equal to $2^M$ times the maximum nominal change frequency of the 8 (N=8) bit signal on bus 14. In this case $2^M/2^{(L-1)}$ is $\frac{1}{8}$. With the three stage frequency divider 286 dividing its input frequency by 8, the N most significant bits of the output (bus 20) of 10 bit counter 18 has a maximum change rate equal to the nominal change rate of the signal on bus 14.

The output of counter 18 on bus 20 may be fed directly to digital to analog converter 34, whose analog output signal is used to drive a conventional three coil air core gauge 58, included in display 38, which is biased by resistors 60 and 62 as shown, whereby the air core gauge 58 displays the advantages of this invention herein recited.

In the circuitry set forth in this specification, the analog to digital converters and digital to analog converters are preferably ratio-metrically biased to the vehicle ignition voltage in accordance with the teachings of above mentioned copending patent application Ser No. 07/944,145 filed Sep. 11, 1992.

Figure 6:
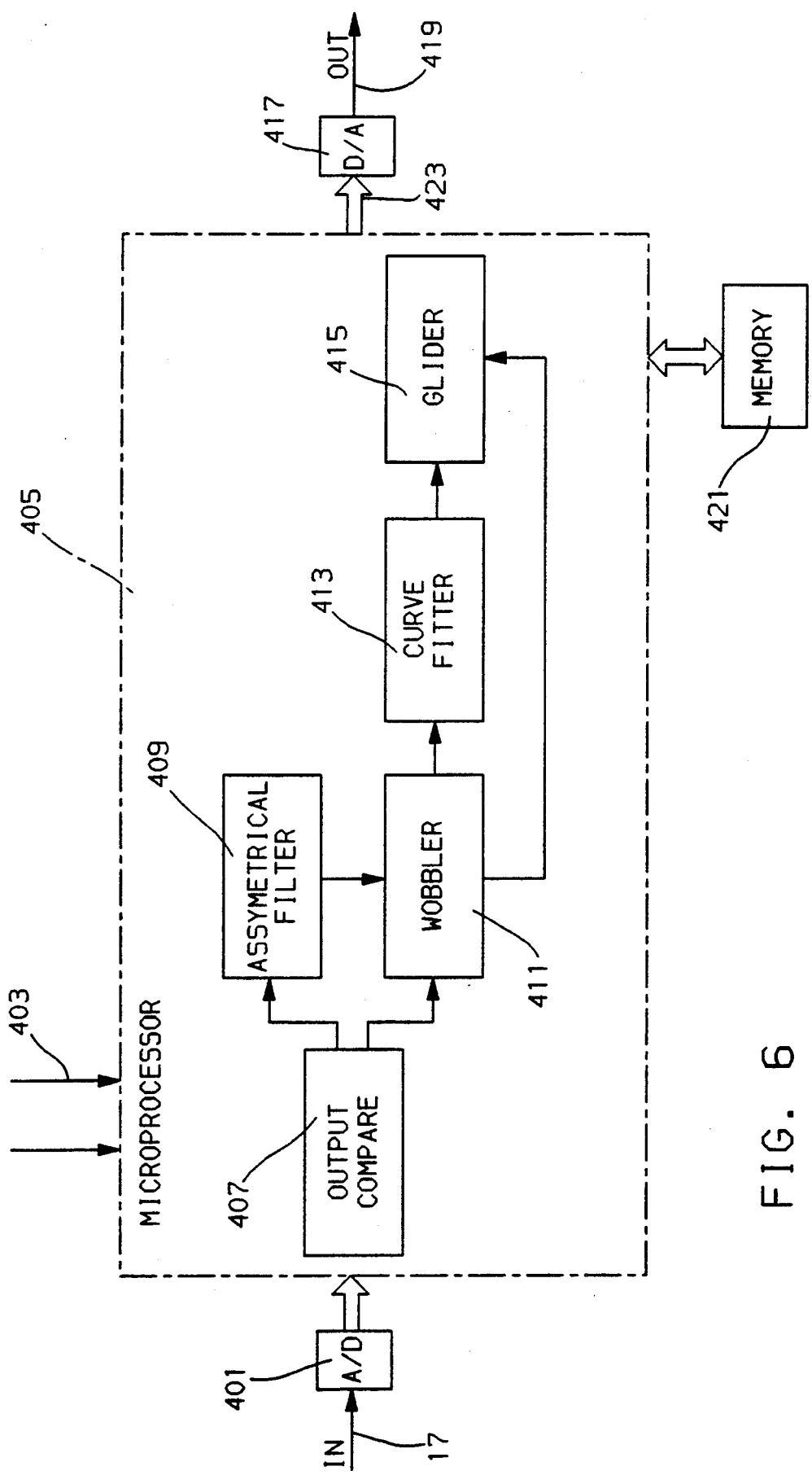
FIG. 6 illustrates an apparatus for a microprocessor implementation of this invention.

Referring to the microprocessor implementation shown in FIG. 6, the sender input signal on line 17 is converted to a digital signal by A/D converter 401 and provided to microprocessor 405. Microprocessor 405 performs the functions required by this invention in accordance with a control program stored in memory 421, the input received from A/D converter 401, and other input lines such as lines 403.

In implementation of the subroutine stored in memory 421, microprocessor 405 periodically compares (block 407) the input from A/D converter 401 with the output provided to D/A converter 417, and performs the asymmetrical filtration, wobbler, curve fitter and glider functions (blocks 409, 411, 413 and 415, respectively). The output is provided to D/A converter 417, which provides an output signal on line 419 used to drive any known type of analog display or gauge. Alternatively, the digital output signal on bus 423 may be directly used to drive a digital or bar graph display.

Figure 7A:
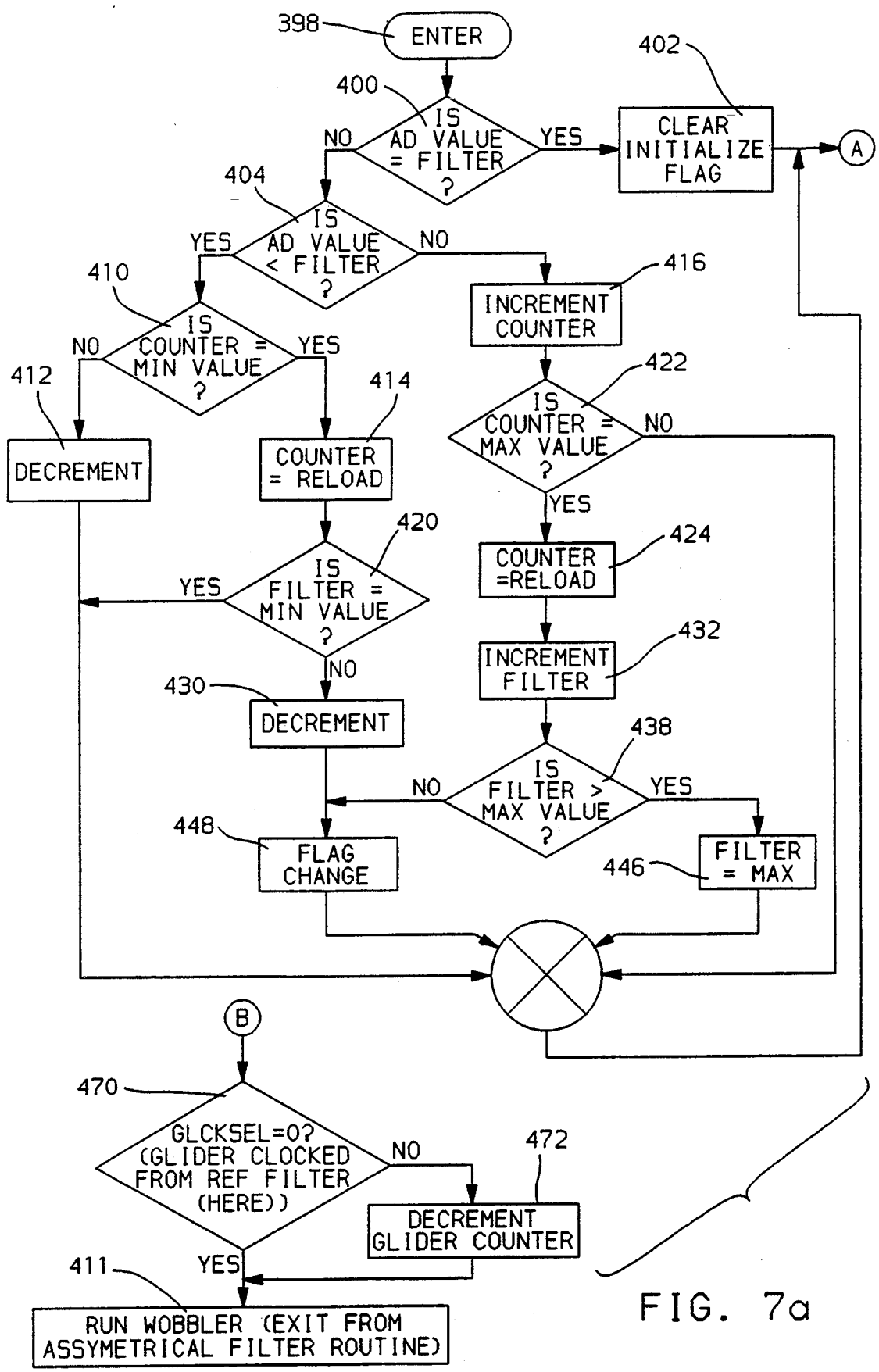
FIGS. 7-9 illustrate a software flow routine for a microprocessor implementation of this invention.
Figure 7B:
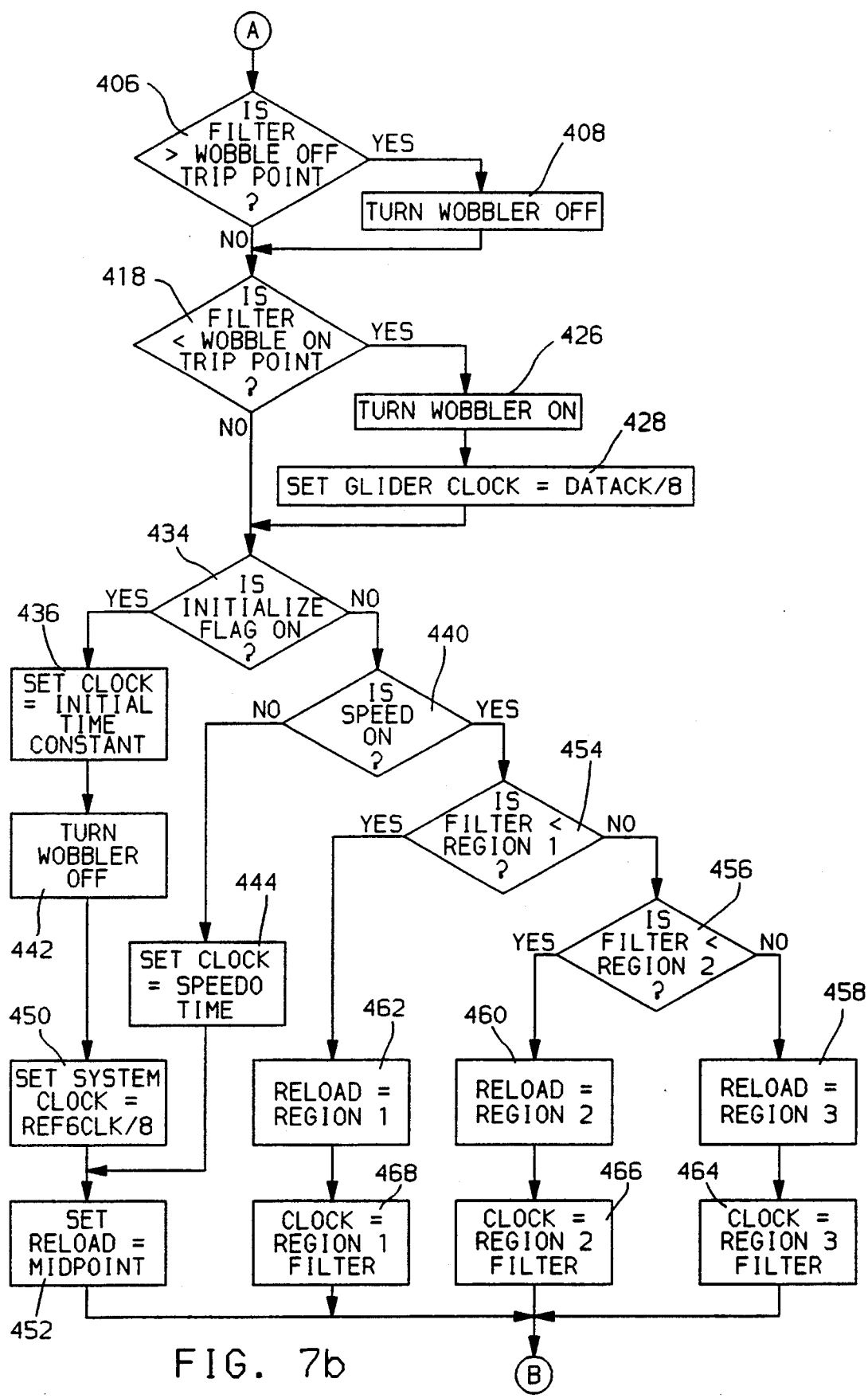

FIGS. 7a and 7b represent a flow diagram for a software subroutine corresponding to the functions of blocks 407 and 409 in FIG. 6. In the subroutine, the variables are defined as follows: RELOAD is the load variable for the first counter, and may be viewed as corresponding to the preset value of counter 300 in FIG. 4b; COUNTER is the value of the first counter, corresponding to the value of counter 300 in FIG. 4b; FILTER is the value of the second counter, corresponding to counter 318, FIG. 4b; CLOCK is a variable representing the frequency of both the first and second counters, corresponding to the clock signal on line 289, FIG. 4b; ADVALUE is the input from the sender through the A/D converter 85, corresponding to the signal on bus 280, FIG. 4b; WOBBLE-ON TRIP POINT and WOBBLE-OFF TRIP POINT represent the wobbler on and off points; and MAX VALUE is the maximum value of COUNTER.

ADVALUE is received from the A/D input at the receipt of an interrupt. Block 400 determines whether or not ADVALUE is equal to FILTER. If ADVALUE equals FILTER, the asymmetrical filtering is bypassed and the routine continues through blocks 402, 406, 408 and 418 where it determines whether or not the wobbler should be on or off.

If the wobbler is turned on at block 426, block 428 sets the glider clock appropriately. At block 434 the routine determines if the system is being initialized. If the system is initializing, CLOCK is set at block 436 to the initial time constant, the wobbler is turned off at block 442, the glider clock source is initialized at block 450, and at block 452 RELOAD is set to the mid-point value. At block 470, if the glider clock select is off, the routine moves to the block 472 where the glider clock is decremented. The routine then moves to block 411, where the wobbler routine is run.

Back at block 400, if ADVALUE is not equal to the FILTER, then the asymmetrical filter routine is run beginning at block 404. If ADVALUE is less than FILTER, at block 404, the routine moves to block 410, where COUNTER is compared to its minimum value. If COUNTER is not equal to its minimum value, COUNTER is decremented at block 412 and the routine advances to block 406.

If COUNTER is at the minimum value at block 410, it is reset at block 414 to the value RELOAD and FILTER is checked at block 420 to determine if it is at its minimum value. If FILTER is at its minimum value, then the routine moves to block 406. If FILTER is not at its minimum value, the routine moves to block 430 where FILTER is decremented, to block 448 where a flag is set indicating that the filter has been decremented and then to block 406.

At block 404, if ADVALUE is not less than FILTER, it is known that ADVALUE is greater than FILTER and the routine moves to block 416 where COUNTER is incremented. The routine then moves to block 422 where COUNTER is compared to its maximum value. If COUNTER is not equal to its maximum value, the routine moves to block 406. If COUNTER is equal to its maximum value, the routine moves to block 424 where COUNTER is set equal to RELOAD and then to block 432 where FILTER is incremented.

At block 438 the if FILTER is greater than its maximum value, FILTER is returned to its maximum value at block 446 and the routine moves to block 406. At block 438, if FILTER is not greater than its maximum value, a flag is set at block 448 and the routine continues to block 406.

At block 434, if the initialization flag is not on, the routine moves to block 440 where it tests for a signal from the speedometer input. If sufficient time has elapsed and there is no signal from the speedometer input, the routine moves to block 444 where CLOCK is set to a fast time constant called SPEEDO-TIME CONSTANT and RELOAD is set to the mid-point of the range of COUNTER. The routine moves on to block 470.

If at block 440 there is no signal from the speedometer, the routine moves to block 454 where FILTER is compared to the variable REGION1. If at block 454 FILTER is less than REGION1, the routine moves to block 462 where RELOAD is assigned a REGION1 asymmetry value and to block 468 where CLOCK is set to the REGION1 filter constant.

If at block 454 FILTER is not less than REGION1, the routine moves to block 456 where FILTER is compared to REGION2. If filter is less than REGION2, the routine moves to block 460 where RELOAD is set equal to the REGION2 asymmetry value and at block 466 CLOCK is set equal to the REGION2 filter constant.

If at block 456 FILTER is not less than REGION2, the routine moves to block 458 where RELOAD is set equal to the REGION3 asymmetry value and the routine moves then to block 464 where CLOCK is set to the REGION3 filter constant. Blocks 464, 466 and 468 all continue to block 470 and to the wobbler routine at block 411.

Figure 8:
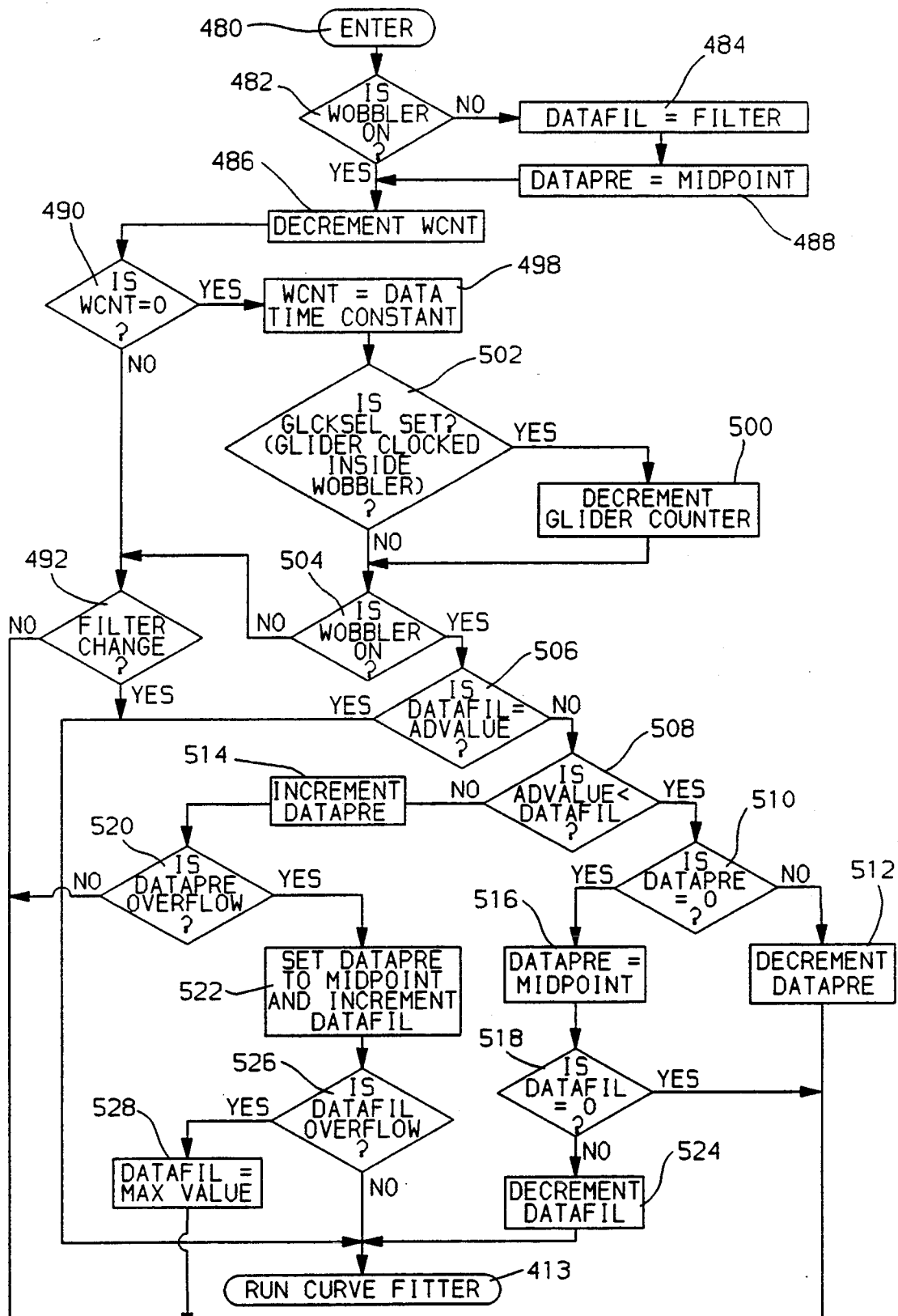

FIG. 8 represents a flow diagram for a software subroutine corresponding to the functions of block 411 in FIG. 6. In the subroutine, the variables are defined as follows: WCNT is a counter value that dictates how often the wobbler is updated; DATAPRE is the variable representing the wobbler prescaler; and DATAFILL is the wobbler counter output.

The wobbler routine begins at block 480 and moves to block 482 where it checks the wobbler flag to determine if the wobbler is on or off. If the wobbler is off, the routine moves to block 484 where DATAFILL is set equal to FILTER, then to block 488 where DATAPRE is set to its midpoint and then to block 486 where WCNT is decremented.

If at block 482 the wobbler is on, then the routine moves straight to block 486 and then to block 490. At block 490, WCNT is compared to zero. If WCNT is not equal to zero, the wobbler routine is not run and the routine moves to block 492. At block 492, the routine determines if FILTER had changed in the last program loop and, if so, the routine moves to block 413 where the curve fitter is run. The curve fitter comprises a simple look-up table function to compensate for system nonlinearities. If, at block 492, it is determined that FILTER had not changed in the last program loop, the routine moves to block 415 where the glider is run.

If at block 490 the variable WCNT equals zero, the routine moves to block 498 where the variable WCNT is reloaded to DATA TIME CONSTANT. The routine then moves to block 502, where the glider clock flag is checked to determine if the glider clock is to be decremented at block 500. If yes, the routine moves to block 500 and decrements the glider clock counter.

The routine then moves to block 504 where it checks again to determine if the wobbler is on. If not the routine moves to block 492. If the wobbler is on, the routine moves to block 506 where it compares DATAFILL with the ADVALUE. If the DATAFILL equals ADVALUE, the routine moves to block 413 where the curve fitter is run. If DATAFILL is not equal to ADVALUE, the routine moves to block 508 where it determines if ADVALUE is greater or less than DATAFILL. If DATAFILL is greater than ADVALUE, the routine moves to block 514 where it increments DATAPRE and then to block 520 where it checks for an overflow of DATAPRE. If there is no overflow, the routine moves to block 415 where the glider is run. If there is an overflow of DATAPRE at block 520, the routine moves to block 522 where DATAPRE is reset to its midpoint and where DATAFILL is incremented.

At block 526, DATAFILL is then checked for an overflow. If there is no overflow, the routine moves to block 413 where the curve fitter is run. If there is an overflow, then DATAFILL is reset to its maximum value at block 528 and the routine moves to block 415 where the glider is run. If at block 508 ADVALUE was less than DATAFILL, the routine moves to block 510 where DATAPRE is compared to zero. If DATAPRE is not equal to zero, the routine moves to block 512 where DATAPRE is decremented and the routine continues on to block 415.

At block 510, if DATAPRE is equal to zero, the routine moves to block 516 where DATAPRE is reset to its midpoint value and then to block 518 where DATAFILL is compared to zero. If DATAFILL equals zero at block 518, the routine moves to block 415 where the glider is run. If DATAFILL is not equal to zero, the routine moves to block 524 where DATAFILL is decremented. The routine then continues to block 413 where the curve fitter is run.

Figure 9:
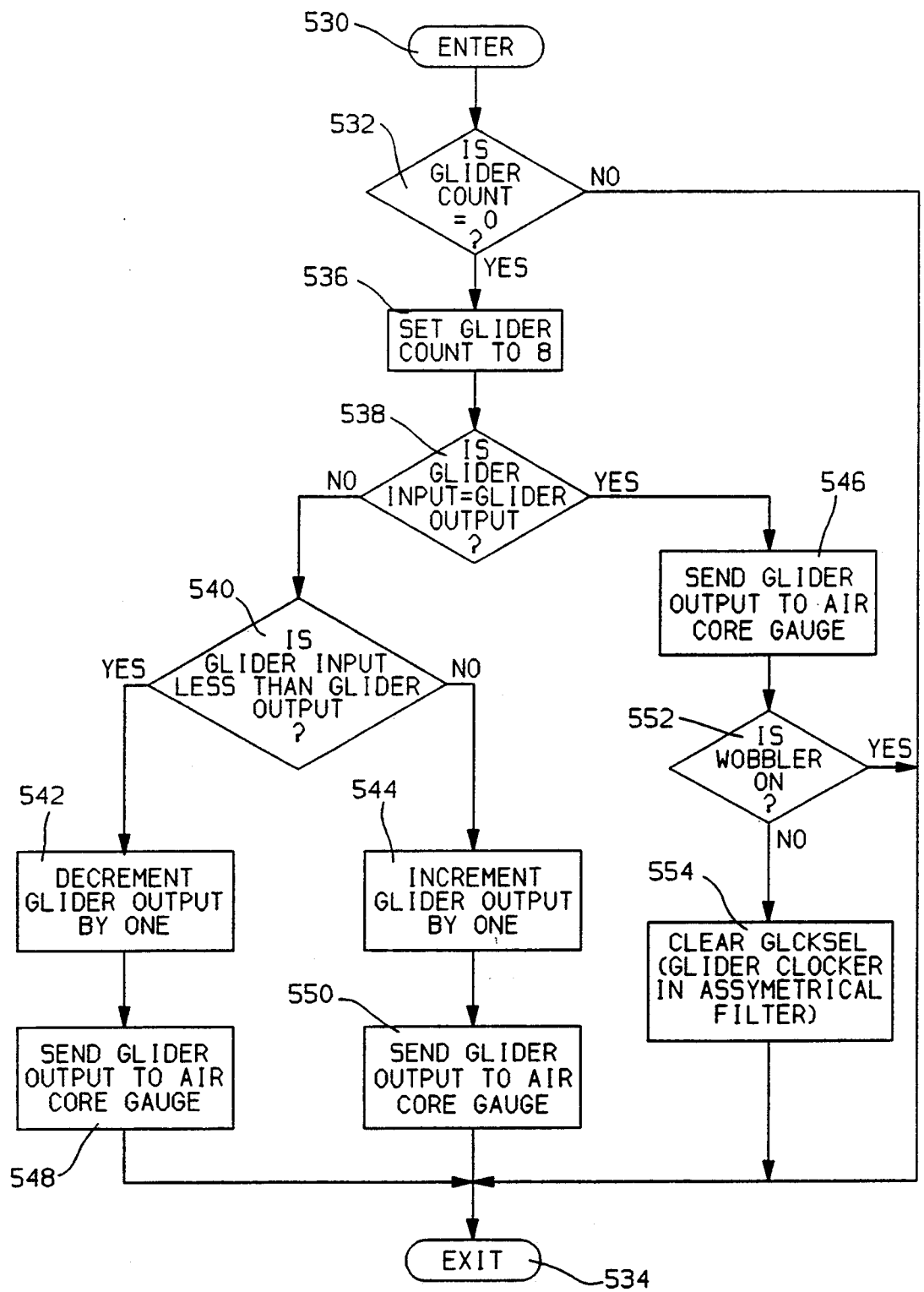

FIG. 9 represents a flow diagram for a software subroutine corresponding to the functions of block 415 in FIG. 6. In the subroutine, the variable GLIDER represents the value of the glider counter, corresponding to counter 18, FIG. 4c; GLIDER COUNT is a timing value used to determine when the glider is run; and INPUT is the value of the glider input received either from the wobbler or the curve fitter.

The glider routine begins at block 530 and moves to block 532, where GLIDER COUNT is compared to zero. If GLIDER COUNT does not equal zero, the glider routine is exited at block 534. If GLIDER COUNT equals zero, the routine continues to block 536, where GLIDER COUNT is set equal to eight.

At block 538, INPUT is compared to GLIDER. If INPUT equals GLIDER, the routine moves to block 546, where the value GLIDER is output to drive a display device. The routine then moves to block 552, where it checks to see if the wobbler is on, if yes, the glider routine is exited at block 534, If the wobbler is off, the glider clock source flag is cleared at block 554.

If, at block 538, INPUT does not equal GLIDER, the routine moves to block 540, where it is determined if INPUT is less than GLIDER. If INPUT is less than GLIDER, then GLIDER is decremented at block 542 and output to a display device at block 548. If INPUT is not less than GLIDER, then GLIDER is incremented at block 544 and output to a display device at block 550. The routine is then exited at block 534.

The above described implementations of this invention are example implementations and are not meant to be limiting on its scope. Moreover, various other improvements and modifications to this invention may occur to those skilled in the art and will fall within the scope of this invention as set forth in the detailed description below.

The embodiments of the invention in which an exclusive property or privilege is claimed are defined as follows:

1. A circuit apparatus comprising:
   means for receiving an N bit input signal;
   means for comparing the N bit input signal with an output signal, the output signal having N+M bits of which there are at least N most significant bits, wherein the comparison compares the N bit input signal with the N most significant bits of the output signal and provides a control output in response to the comparison;

means for counting, which increments or decrements an N+M bit count output in response to the control output of the comparing means, and for providing the N+M bit count output on an output bus, said bus having resolution greater than N bits, as the N+M bit output signal, wherein the N+M bit output signal has an apparent resolution improvement of $2^M$ over the N bit input signal.

2. The circuit apparatus of claim 1, wherein the counting means (i) increments the N+M bit count output if the N bit input signal is greater than the N most significant bits of the output signal and (ii) decrements the N+M bit count output if the N bit input signal is less than the N most significant bits of the output signal.

3. The circuit apparatus of claim 1, also comprising:
means for converting the output signal to an analog signal; and
analog circuit responsive to the analog signal.

4. The circuit apparatus of claim 3 wherein the analog circuit comprises an analog display.

5. The circuit apparatus of claim 4 wherein the analog display comprises an air core gauge, whereby the air core gauge is driven with an improved apparent resolution.

6. The circuit apparatus of claim 5, wherein the air core gauge includes a pointer that appears to sweep rather than move in a step-wise manner.

7. The apparatus of claim 1, also comprising:
a variable resistance sender providing a sender output signal; and
digital processing circuitry, coupled to the variable resistance sender and providing the N bit input signal responsive thereto.

8. A vehicle fuel level measurement and display system, comprising:
means for sensing a fuel level and for providing a fuel level sense signal;
means for processing the fuel level signal and for providing an N bit digital input signal responsive thereto;
means for comparing the N bit input signal with an output signal, the output signal having N+M bits of which there are at least N most significant bits, wherein the comparison compares the N bit input signal with the N most significant bits of the output signal and provides a control output in response to the comparison;
means for counting, which increments or decrements an N+M bit count output in response to the control output of the comparing means, and for providing the N+M bit count output on an output bus as the N+M bit output signal, wherein the N+M bit output signal has an apparent resolution improvement of $2^M$ over the N bit input signal; and
means for driving a display responsive to the N+M bit output signal, said display having resolution greater than N bits.

9. The apparatus set forth in claim 8, also comprising:
a digital to analog converter receiving the N+M bit output signal and providing an analog signal responsive thereto; and
an analog gauge coupled to the digital to analog converter, receiving the analog signal and displaying an indication of fuel level in response thereto.

10. The apparatus set forth in claim 9 wherein the analog gauge is an air core gauge.

11. The apparatus set forth in claim 10 whereby the air core gauge includes a pointer that appears to sweep between position instead of moving in a step-wise manner.

12. The apparatus set forth in claim 11, wherein the processing means filters the fuel level signal.

13. The apparatus set forth in claim 8 wherein the counting means counts at a frequency determined by a clock pulse.

14. The apparatus set forth in claim 13, wherein the counting means counts at a high frequency when the tank is being filled and shifts to count at a lower frequency when the displayed fuel level equals the actual fuel level.

15. The apparatus set forth in claim 13, also comprising a logic circuit receiving a fast and a slow clock pulse, wherein the logic circuit selectively couples the fast and the slow clock pulses to the counting means.

16. The apparatus set forth in claim 15 wherein the logic circuit couples the fast clock pulse to the counting means when the fuel tank is being filled and couples the slow clock pulse to the counting means when the displayed fuel level equals the actual fuel level.

17. An apparatus comprising:
a digital processing circuit providing an N bit signal that has a maximum nominal change rate;
means for comparing the N bit signal to an output signal, the output signal having N+M bits of which there are at least N most significant bits, wherein the comparison compares the N bit signal with the N most significant bits of the output signal and provides a control output in response to the comparison;
means for counting, which increments or decrements an N+M bit count output in response to the control output of the comparing means and a first clock signal, and for providing the N+M bit count output on an output bus, said bus having resolution greater than N bits, as the N+M bit output signal, wherein the N+M bit output signal has an apparent resolution improvement of $2^M$ over the N bit signal; and
means for providing the clock signal to the counting means, wherein the clock signal has a frequency substantially equal to $2^M$ times the maximum nominal change rate of the N bit signal.

18. The apparatus set forth in claim 17, wherein the processing circuit comprises:
an up/down counter having L bits, counting up and counting down in response to an input signal and a second clock signal having a clock frequency, the up/down counter having overflow and underflow conditions and resetting to a preset after every overflow and underflow condition;
a digital counter counting up and down in response to the overflow and underflow conditions and providing an N bit count output signal as the N bit signal, where the N bit signal has a maximum nominal change rate equal to the clock frequency divided by $2^{(L-1)}$.

* * * * *